United States Patent [19]
Streitman et al.

[11] Patent Number: 5,836,571
[45] Date of Patent: Nov. 17, 1998

[54] DISC DIAPHRAGM FOR AN INTERGRATED COCK VALVE

[75] Inventors: Lawrence R. Streitman, Pittsburgh; Lawrence M. Kushnir, Jr., Huntingdon; Ronald M. Markos, Harrison City, all of Pa.

[73] Assignee: Westinghouse Air Brake Company, Wilmerding, Pa.

[21] Appl. No.: 896,464

[22] Filed: Jul. 18, 1997

[51] Int. Cl.[6] ................................................. F16K 31/126
[52] U.S. Cl. ................................ 251/331; 251/368; 92/99
[58] Field of Search ................................ 251/331, 61.2, 251/368; 92/98 R, 99

[56] References Cited

U.S. PATENT DOCUMENTS

| | | | |
|---|---|---|---|
| 2,916,255 | 12/1959 | Koehler | 251/331 |
| 3,771,907 | 11/1973 | Neumann et al. | 92/98 R |
| 4,375,882 | 3/1983 | Schreiber, Jr. | 251/368 X |
| 5,490,659 | 2/1996 | Whiteside | 251/331 X |

*Primary Examiner*—Kevin Lee
*Attorney, Agent, or Firm*—James Ray & Associates

[57] ABSTRACT

The present invention provides a combination disc diaphragm assembly which comprises a disc portion having a first configuration and includes a round center portion having a first diameter and a first thickness. It further includes a round outer portion connected to and extending outwardly from an outer periphery of such center portion adjacent a bottom surface. The outer portion has a second diameter which is greater than such first diameter. The outer portion has a second thickness which is less than the first thickness. The disc also has a domed shaped cavity formed in the bottom surface and having a first radius. There is a diaphragm member having a second configuration and a third diameter which is greater than the second diameter of the disc. The diaphragm has a first side with a dome shaped projection disposed on a center portion. The domed shaped projection has a second radius. The first side of the diaphragm has a generally flat surface adjacent the dome shaped center. The diaphragm also has a second side having a dome shaped cavity formed in a center portion. The domed shaped cavity has a third radius. There is further a connection to the bottom surface of the disc portion and to a surface of the dome shaped projection and flat surface adjacent the domed shaped projection of the first side of the diaphragm for bonding the first side of the diaphragm member to the bottom portion of the disc portion.

20 Claims, 3 Drawing Sheets

DISC DIAPHRAGM FOR AN INTERGRATED COCK VALVE

FIELD OF THE INVENTION

The present invention relates, in general, to cock valves that are used in pneumatic brake equipment, and, more particularly, the present invention relates to diaphragm type cock valves, and, still more particularly, the present invention relates to an improved disc diaphragm for such cock valves.

BACKGROUND OF THE INVENTION

Cock valves have been used in the railroad industry for countless years. The type and variety of cock valves that are used are seemingly endless. One such type of cock valve is a diaphragm type cock valve which finds application in pneumatic braking systems of railway moving stock.

These cock valves rely on a diaphragm made of rubber or other such elastomer to provide sealing. One major problem that is encountered with these prior art type elastomer diaphragms is that after use the diaphragm loses elasticity and does not return to its original shape. When this occurs the sealing is adversely affected.

Similar detrimental results occur when increased compression is needed in order for the diaphragm to seal. In this case there is a problem of distortion of the diaphragm with the end results being the same in that the diaphragm no longer provides adequate sealing.

Because all of these problems result in a shortened useful service life of diaphragms in such diaphragm cock valves, there is a need for an improved design in the diaphragm than can offset the present problems and provide a diaphragm with a longer useful life in service.

SUMMARY OF THE INVENTION

The present invention provides a combination disc diaphragm assembly for use in a preselected valve assembly, such combination disc diaphragm assembly includes a disc like portion having a first predetermined configuration. Such disc like portion includes a generally round center portion having each of a first predetermined diameter and a first predetermined thickness. Such disc like portion further includes a generally round outer portion connected to and extending outwardly from an outer periphery of such generally round center portion adjacent a bottom surface thereof. Such generally round outer portion has a second predetermined diameter which is greater than such first predetermined diameter of such generally round center portion. Such generally round outer portion has a second predetermined thickness which is less than such first predetermined thickness of such generally round center portion. Such disc like portion also has a domed shaped concave cavity formed in the bottom surface of such generally round center portion and substantially in a center thereof. Such domed shaped cavity has a first predetermined radius. The present invention further has a generally round diaphragm member having a second predetermined configuration and a third predetermined diameter which is greater than such second predetermined diameter of such generally round outer portion of such disk like member. Such diaphragm member includes a first side having a dome shaped projection disposed on a center portion of such first side of the diaphragm member, such domed shaped projection having a second predetermined radius. Such first side of such diaphragm member has a generally flat surface adjacent an outer periphery of such dome shaped center portion. Such diaphragm member also has a second side having a dome shaped cavity formed in a center portion of such second side of such diaphragm member. Such domed shaped cavity has a third predetermined radius. The present invention also has a means connected to each of such bottom surface of such generally round center portion and a surface of such cavity formed in such generally round center portion and a bottom surface of such generally round outer portion of such disk like portion. There is also a means connected to a surface of such dome shaped projection disposed on a center portion of such first side of such diaphragm member and such generally flat surface adjacent such outer periphery of such dome shaped center portion. Such means is for bonding such center portion of such first side of such diaphragm member to such bottom portion of said disc like portion of said combination disc diaphragm assembly.

OBJECTS OF THE INVENTION

It is, therefore, one of the primary objects of the present invention to provide a new diaphragm design which will provide a diaphragm with a longer usable service life.

It is an additional object of the present invention to provide a new diaphragm design which will provide a diaphragm which will reduce the distortion effects from compression.

It is further an object of the present invention to provide a new diaphragm design which will provide a diaphragm which will seal at a lower compression.

It is yet another object of the present invention to provide a new diaphragm design which will provide a diaphragm that will provide an area for the diaphragm to bulge into to alleviate over compression distortion.

It is still another object of the present invention to provide a new diaphragm design which will provide a diaphragm that will distribute more even compression and so provide a more parallel seat seal.

In addition to the objects and advantages of the present invention which have been described in detail above, various other objects and advantages will become readily apparent to those persons skilled in valve systems and more particularly diaphragm cock valves from the following more detailed description of such invention, particularly, when such description is taken in conjunction with the attached drawing Figures and with the appended claims.

Figure 1:
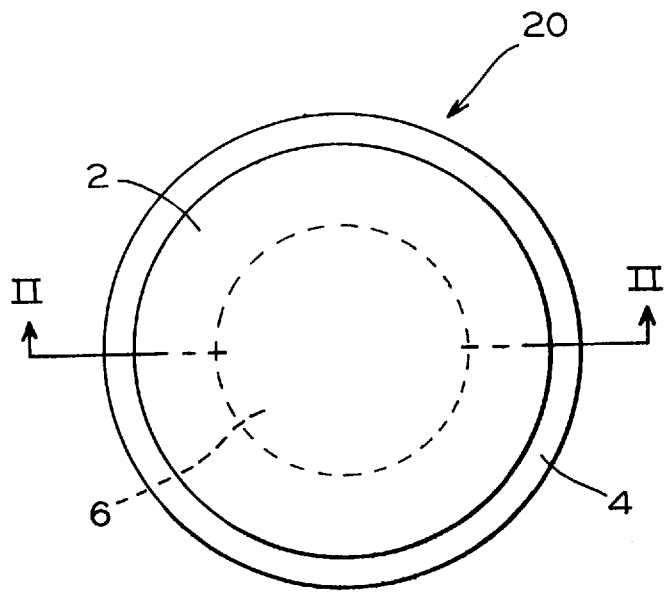
FIG. 1 is a plan view of a disc portion of a disc diaphragm incorporating a presently preferred embodiment of the present invention.

BRIEF DESCRIPTION OF THE PRESENTLY PREFERRED AND VARIOUS ALTERNATE EMBODIMENTS OF THE INVENTION

Prior to proceeding to the more detailed description of the present invention, it should be noted that for the sake of clarity in understanding the invention, identical components with identical functions have been designated with identical reference numerals throughout the drawing Figures.

Figure 2:
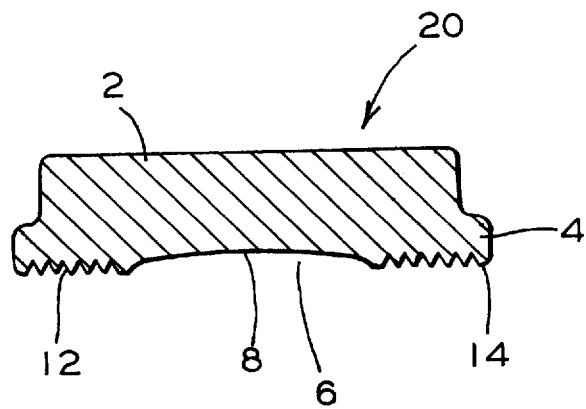
FIG. 2 is a cross sectional view of a disc portion of the present invention taken along the lines II—II of FIG. 1.

Reference is now made particularly to FIGS. 1 and 2. Illustrated therein is a disc portion, generally designated 20, of a disc diaphragm of the present invention which has a first predetermined configuration. Such disc portion 20 has a generally round center portion 2 having each of a predetermined diameter and a first predetermined thickness. Such disc portion 20 further has a generally round outer portion 4 connected to and extending outwardly from such generally round center portion 2, adjacent a bottom surface 8 thereof. Such generally round outer portion 4 of disc portion 20 has a second predetermined diameter, which is greater than such first predetermined diameter of such generally round center portion 2.

Generally round outer portion 4 also has a second predetermined thickness which is less than such first predetermined thickness of such generally round center portion 2.

Such disc portion 20 further has a dome shaped cavity 6 formed in such bottom surface 8 of such generally round center portion 2. Dome shaped cavity 6 is formed substantially in a center of generally round center portion 2. Such dome shaped cavity 6 has a first predetermined radius.

In a presently preferred embodiment of the present invention such generally round outer portion 4 further has a series of saw-tooth like grooves 12 on a bottom surface 14 of such generally round outer portion 4.

In an embodiment of the invention such disc portion 20 is selected from one of a metal and a metallic alloy. In a presently preferred embodiment of the invention such metallic alloy is brass.

Figure 3:
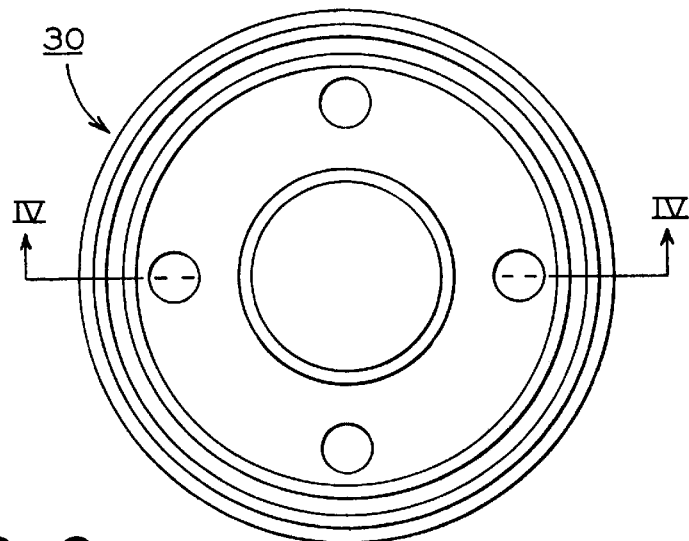
FIG. 3 is a plan view of a disc diaphragm incorporating a presently preferred embodiment of the invention.
Figure 4:
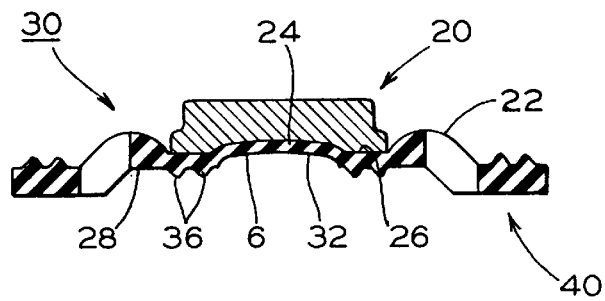
FIG. 4 is a cross sectional view of a disc diaphragm taken along the lines IV—IV of FIG. 3.
Figure 5:
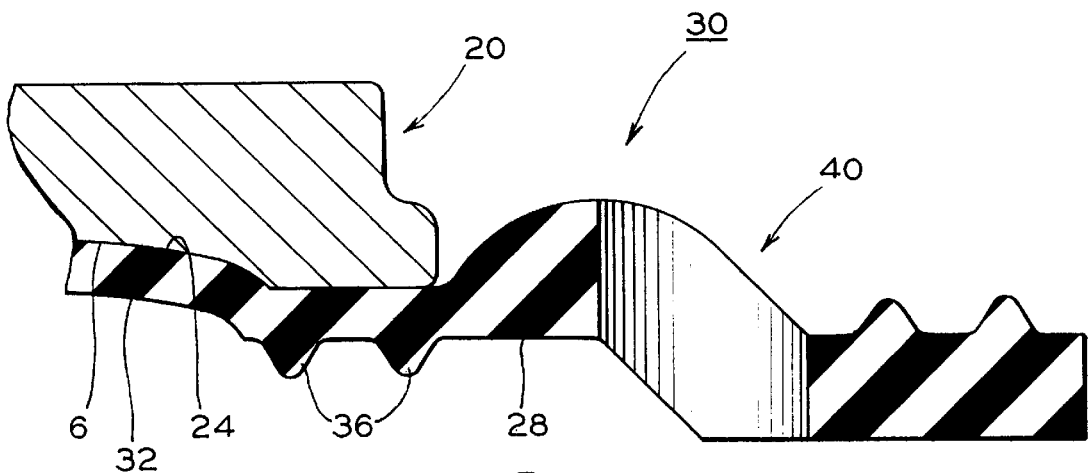
FIG. 5 is an enlarged cross sectional view of the disc diaphragm taken across a radius of the diaphragm illustrated in FIG. 4.

Reference is now made to FIGS. 3, 4 and 5. Illustrated therein is a combination disc diaphragm, generally designated 30, incorporating a presently preferred embodiment of the present invention. Combination disc diaphragm 30 has a generally round diaphragm member, generally designated 40, and a disc portion 20. Such generally round diaphragm member 40 has a second predetermined configuration and a third predetermined diameter. Such third predetermined diameter is greater than such second predetermined diameter of such outer portion 4 of such disc like member 20.

Generally round diaphragm member 40, having a convex portion formed in the center of such diaphragm 40, has a first side 22 which has a dome shaped projection 24 disposed as part of such convex portion. Such domed shaped projection 24 has a second predetermined radius. Such first side 22 of such convex portion of diaphragm member 40 has a generally flat surface 26 adjacent an outer periphery of such convex portion.

Generally round diaphragm member 40 further has a second side 28 which has a dome shaped cavity 32 formed as part of such convex portion. Such domed shaped cavity 32 of the convex portion of diaphragm 40 has a third predetermined radius.

In a presently preferred embodiment of the invention such first predetermined radius of such dome shaped cavity 6 of generally round center portion 2 of disc portion 20 and such second predetermined radius of such domed shaped projection 24 of such first side 22 of such convex portion of generally round diaphragm member 40 are essentially the same.

Also, in a presently preferred embodiment of the invention such second predetermined radius of such domed shaped projection 24 of such first side 22 of the convex portion of generally round diaphragm member 40 and such third predetermined radius of such dome shaped cavity 32 of such second side 28 of such convex portion of generally round diaphragm member 40 are essentially the same.

Figure 6:
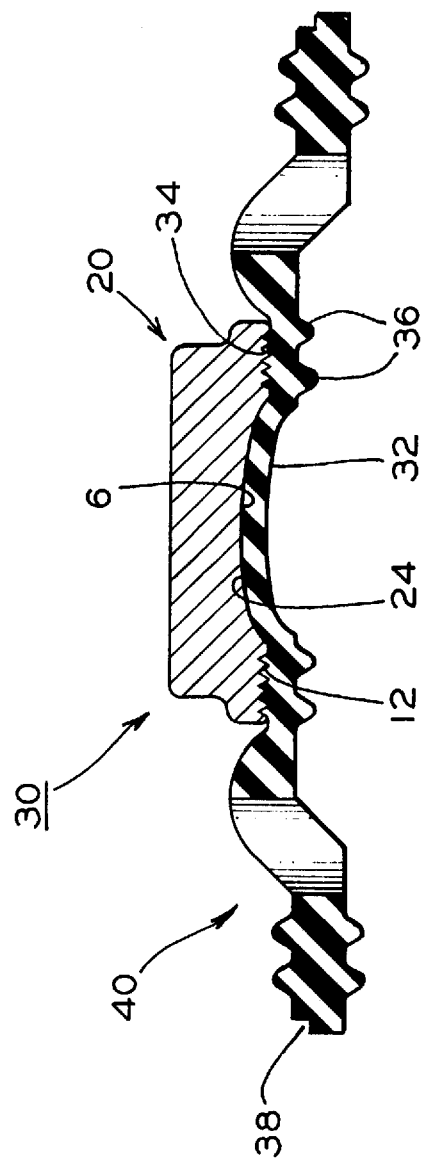
FIG. 6 is an enlarged cross sectional view of a disc diaphragm showing several alternate embodiments of the present invention.

Reference is now made, more particularly, to FIG. 6. Illustrated therein is an enlarged cross sectional view of a combination disc diaphragm 30 of the present invention. Evident in FIG. 6 is a series of saw-tooth grooves 12 on a bottom surface 14 of such generally round outer portion 4 of disc portion 20. Also evident is a series of saw-tooth grooves 34 on such generally flat surface 26 adjacent an outer periphery of such dome shaped center portion 24 of first side 22 of diaphragm member 40.

In a presently preferred embodiment of the invention such saw-tooth grooves 12 on a bottom surface 14 of such generally round outer portion 4 of disc portion 20 and such saw-tooth grooves 34 on such generally flat surface 26 of first side 22 of diaphragm member 40 are essentially the same. In such presently preferred embodiment of the invention such saw-tooth grooves 12 and saw-tooth grooves 34 are designed to mate when such diaphragm member 40 is molded to such disc portion 20. When such diaphragm member 40 is molded to such disc portion 20 such combination disc diaphragm 30 is formed.

In an alternate embodiment of the invention such disc portion 20 is bonded to such diaphragm member 40 through the use of an adhesive to form such combination disc diaphragm 30.

FIGS. 4, 5 and 6 show a presently preferred embodiment of the invention in which a series of at least two bead like projections 36 extend outwardly on such bottom surface of such second side 28 of diaphragm member 40. These bead like projections 36 extend outward and have an arcuate shape. Bead like projections 36 are on an area adjacent a periphery of said dome shaped cavity 32 of said second side 28 of said diaphragm member 40. FIGS. 4 and 5 show an embodiment where two bead like projections 36 are present while FIG. 6 shows an embodiment with three bead like projections 36.

Bead like projections 36 provide such disc diaphragm 30 with better sealability with reduced compression. Such bead like projections 36 further permit a larger area for center dome shaped cavity 32 to bulge into, thus creating a wider window for over compression distortion.

Also evident in FIG. 6 is an alternate embodiment of the invention in which notch 38 is disposed in such outside diameter of diaphragm member 40. Such notch 36 at the outside diameter provides a thinner cross section at the OD for better trim and control of such outside diameter.

The present invention of a combination disc diaphragm 30 provides a relief area for such rubber or other elastomer in diaphragm member 40 to bulge into as a result of compression, substantially preventing the distortion, currently exhibited by prior art type diaphragms, that results from compression. Such an area may also prevent rubber from extruding into such cock body part.

Further, the present invention with such disc portion 20 bonded to such diaphragm member 40 to form combination disc diaphragm 30 provides a flat seat and the extended disc permits the use of the total seat and makes it possible to distribute more even compression to help out of parallel seat seals.

While a presently preferred embodiment of the present invention has been described in detail above, it should be understood that various other adaptations and/or modifications of the invention can be made by those persons who are particularly skilled in the art related to valve systems and, more particularly, diaphragm cock valves without departing from either the spirit of the invention or the scope of the appended claims.

I claim:

1. A combination disc diaphragm assembly for use in a preselected valve assembly, said combination disc diaphragm assembly comprising:
   (a) a disc portion having a first configuration, said disc portion including:
      (i) a generally round center portion having a first predetermined diameter and a first predetermined thickness,
      (ii) a generally round outer portion formed as a protrusion and extending outwardly from an outer periphery of said generally round center portion adjacent a bottom surface thereof, said generally round outer portion having a second predetermined diameter which is greater than said first predetermined diameter of said generally round center portion and a second predetermined thickness, and
      (iii) a domed shaped cavity formed in said bottom surface of said generally round center portion and substantially in a center thereof, said domed shaped cavity having a first radius; and
   (b) a generally round diaphragm member having a second configuration, said diaphragm member including:
      (i) a convex portion formed in a center portion of said diaphragm member,
      (ii) a first side having a dome shaped projection disposed as part of said convex portion of said diaphragm member, said domed shaped projection having a second radius, said first side of said diaphragm member having a generally flat surface adjacent an outer periphery of said convex portion, and
      (iii) a second side having a dome shaped cavity disposed as part of said convex portion of said diaphragm member, said domed shaped cavity having a third radius; and
   (c) means connected to each of said bottom surface of said generally round center portion and a surface of said cavity formed in said generally round center portion and a bottom surface of said generally round outer portion of said disc portion and a surface of said dome shaped projection disposed as part of said convex portion of said first side of said diaphragm member and said generally flat surface adjacent said outer periphery of said convex portion for bonding said convex portion of said first side of said diaphragm member to said bottom portion of said disc portion of said combination disc diaphragm assembly.

2. A combination disc diaphragm assembly for use in a preselected valve assembly, according to claim 1, wherein said first predetermined thickness of said generally round center portion of said disc portion is greater than said second predetermined thickness of said generally round outer portion of said disc portion.

3. A combination disc diaphragm assembly for use in a preselected valve assembly, according to claim 1, wherein said second side of said diaphragm further has at least one bead like projection, projecting outward and having an arcuate shape, on an area adjacent a periphery of said dome shaped cavity of said second side of said diaphragm member.

4. A combination disc diaphragm assembly for use in a preselected valve assembly, according to claim 3, wherein said second side of said diaphragm further has a plurality of bead like projections, each projection extending outward and having an arcuate shape, on an area adjacent a periphery of said dome shaped cavity of said second side of said diaphragm member.

5. A combination disc diaphragm assembly for use in a preselected valve assembly, according to claim 1, wherein said diaphragm member further has a notch in an outside diameter of said diaphragm member so as to provide a thinner cross section at an outer periphery of said outside diameter of said diaphragm member.

6. A combination disc diaphragm assembly for use in a preselected valve assembly, according to claim 1, wherein said first radius of said dome shaped cavity of said bottom surface of said generally round center portion of said disc portion and said second radius of said domed shaped projection of said first side of said convex portion of said generally round diaphragm member are substantially identical.

7. A combination disc diaphragm assembly for use in a preselected valve assembly, according to claim 1, wherein said second radius of said domed shaped projection of said first side of said convex portion of said generally round diaphragm member and said third radius of said domed shaped cavity of said second side of said convex portion of said generally round diaphragm member are substantially identical.

8. A combination disc diaphragm assembly for use in a preselected valve assembly, according to claim 1, wherein said disc portion having a first configuration is selected from one of a metal and a metallic alloy.

9. A combination disc diaphragm assembly for use in a preselected valve assembly, according to claim 8, wherein said metallic alloy is brass.

10. A combination disc diaphragm assembly for use in a preselected valve assembly, according to claim 1, wherein said generally round outer portion of said disk portion has at least one saw-tooth like groove formed on said bottom surface.

11. A combination disc diaphragm assembly for use in a preselected valve assembly, according to claim 10, wherein said generally round outer portion of said disk portion has a plurality of saw-tooth like grooves formed on said bottom surface.

12. A combination disc diaphragm assembly for use in a preselected valve assembly, according to claim 10, wherein said generally flat surface adjacent said outer periphery of said dome shaped center portion of said first side of said diaphragm member has at least one saw-tooth like groove on said generally flat surface.

13. A combination disc diaphragm assembly for use in a preselected value assembly, according to claim 11, wherein said generally flat surface adjacent said outer periphery of said dome shaped projection of said first side of said convex portion of said diaphragm member has a plurality of saw-tooth like grooves on said generally flat surface.

14. A combination disc diaphragm assembly for use in a preselected valve assembly, according to claim 9, wherein said plurality of saw-tooth like grooves on said generally flat surface adjacent said outer periphery of said dome shaped projection of said first side of said convex portion of said diaphragm member and said series of saw-tooth like grooves on said generally round outer portion of said disk portion are substantially identical.

15. A combination disc diaphragm assembly for use in a preselected valve assembly, according to claim 1, wherein said means for bonding said dome shaped projection of said first side of said convex portion of said diaphragm member to said bottom portion of said disc portion of said combination disc diaphragm assembly involves molding said diaphragm member to said bottom portion of said disc portion.

16. A combination disc diaphragm assembly for use in a preselected valve assembly, according to claim 1, wherein said means for bonding said dome shaped projection of said first side of said convex portion of said diaphragm member to said bottom portion of said disc portion of said combination disc diaphragm assembly is an adhesive.

17. A combination disc diaphragm assembly for use in a preselected valve assembly, according to claim 1, wherein said diaphragm member having a second configuration is an elastomer selected from one of rubber, synthetic rubber, neoprene, nitrile and fluoroelastomers.

18. A combination disc diaphragm assembly for use in a preselected valve assembly, according to claim 1, wherein said elastomer is rubber.

19. A combination disc diaphragm assembly for use in a preselected valve assembly, according to claim 1, wherein said second configuration of said diaphragm is generally round.

20. A combination disc diaphragm assembly for use in a preselected valve assembly, according to claim 19, wherein said diaphragm has a third predetermined diameter which is greater than said second predetermined diameter of said generally round outer portion of said disk portion.

* * * * *